US008484565B2

(12) United States Patent
Yamashita

(10) Patent No.: US 8,484,565 B2
(45) Date of Patent: *Jul. 9, 2013

(54) NETWORK-MANAGEMENT DEVICE, NETWORK-MANAGEMENT METHOD, AND COMPUTER PROGRAM PRODUCT

(71) Applicant: Akihiro Yamashita, Kanagawa (JP)

(72) Inventor: Akihiro Yamashita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,066

(22) Filed: Oct. 16, 2012

(65) Prior Publication Data

US 2013/0042181 A1  Feb. 14, 2013

Related U.S. Application Data

(63) Continuation of application No. 11/831,295, filed on Jul. 31, 2007, now Pat. No. 8,316,304.

(30) Foreign Application Priority Data

Aug. 21, 2006  (JP) ................................. 2006-224590

(51) Int. Cl.
*G06F 15/177* (2006.01)
(52) U.S. Cl.
USPC ............................ 715/734; 715/736; 709/203
(58) Field of Classification Search
USPC ......................... 715/736, 734; 709/223, 224
See application file for complete search history.

(56) References Cited

U.S. PATENT DOCUMENTS

| 5,295,244 | A  | * | 3/1994  | Dev et al. ....................... 715/853 |
| 5,353,399 | A  | * | 10/1994 | Kuwamoto et al. ........... 715/736 |
| 5,910,803 | A  |   | 6/1999  | Grau et al. |
| 6,020,889 | A  |   | 2/2000  | Tarbox et al. |
| 6,029,246 | A  |   | 2/2000  | Bahr |
| 6,041,349 | A  | * | 3/2000  | Sugauchi et al. ............. 709/223 |
| 6,307,546 | B1 | * | 10/2001 | Wickham et al. ............. 715/771 |
| 6,308,205 | B1 | * | 10/2001 | Carcerano et al. ............ 709/221 |
| 6,425,007 | B1 |   | 7/2002  | Messinger |

(Continued)

FOREIGN PATENT DOCUMENTS

| JP | 04-060758   | 2/1992 |
| JP | 2000-194626 | 7/2000 |
| JP | 2002-024132 | 1/2002 |
| JP | 2004-110704 | 4/2004 |

OTHER PUBLICATIONS

Office Action issued May 24, 2011, in Japanese Patent Application 2006-224590.

*Primary Examiner* — Phenuel Salomon
(74) *Attorney, Agent, or Firm* — Oblon, Spivak, McClelland, Maier & Neustadt, L.L.P.

(57) ABSTRACT

A network-management device includes a map storing unit and a map state storing unit. The map storing unit stores therein a map created based on information on network devices. The map state storing unit stores therein a creation state indicating that creation of the map is in process or completed in association with the map. When creation of the map is in process, disclosure of the map is prohibited, and all the network devices are notified that creation of the map is in process. When creation of the map is completed, it is checked whether all the network devices are laid out on the map. When all the network devices are laid out on the map, disclosure of the map is permitted.

10 Claims, 11 Drawing Sheets

U.S. PATENT DOCUMENTS

| | | | |
|---|---|---|---|
| 6,493,755 B1 | 12/2002 | Hansen et al. | |
| 6,732,170 B2 | 5/2004 | Miyake et al. | |
| 7,095,319 B2 | 8/2006 | Izumi et al. | |
| 7,315,985 B1 | 1/2008 | Gauvin et al. | |
| 7,363,362 B1 * | 4/2008 | Friedman et al. | 709/223 |
| 7,383,340 B2 * | 6/2008 | Rover et al. | 709/227 |
| 7,421,466 B2 | 9/2008 | Haines | |
| 7,739,037 B2 * | 6/2010 | Sumizawa et al. | 701/453 |
| 2001/0017620 A1 * | 8/2001 | Nara | 345/204 |
| 2004/0177066 A1 | 9/2004 | Igarashi | |
| 2005/0086332 A1 | 4/2005 | Nakazawa | |
| 2005/0086654 A1 | 4/2005 | Sumi et al. | |
| 2005/0165922 A1 | 7/2005 | Hatano | |
| 2005/0188067 A1 * | 8/2005 | Kawashima | 709/223 |

* cited by examiner

LOGIN :

PASSWORD :

FIG. 5

Printer Management ▷ Access Log List ▷ Job Log List     👤 administrator

Organization>Sales Department>
Oversea Sales>Group B

Printers

Edit ▾ | Printer ▾ | Filter ▾ | View ▾ | Sort By ▾

1-12 /12 item(s)  Selected: XX

| | IP Address | Mac Address | System | Printer | Model Name | Printer Counter | Registered Group | Serial Number |
|---|---|---|---|---|---|---|---|---|
| ☐ | 133.139.162.200 | 00-00-74-6C-06-87 | | ◉ | Aficio 1224C | 15673 | TEAM B | 12345678 |
| ☐ | 133.139.162.201 | 00-00-74-6C-06-87 | | ◉ | Aficio 1224C | 15673 | TEAM B | 12345678 |
| ☐ | 133.139.162.203 | 00-00-74-6C-06-87 | 🗎 | ▣ | Aficio AP400 | 4800 | TEAM B | 12345678 |
| ☐ | 133.139.162.204 | 00-00-74-6C-06-87 | | ◉ | Aficio CL100 | 14000 | TEAM D | 12345678 |
| ☐ | 133.139.162.205 | 00-00-74-6C-06-87 | | ▦ | Aficio 2232C | 3210 | TEAM B | 12345678 |
| ☐ | 133.139.162.206 | 00-00-74-6C-06-87 | ❓ | ❗ | Aficio 2232C | 10020 | TEAM B | 12345678 |
| ☐ | 133.139.162.207 | 00-00-74-6C-06-87 | | ❗ No Response from Device | Aficio 1224C | 11278 | TEAM B | 12345678 |
| ☐ | 133.139.162.208 | 00-00-74-6C-06-87 | | ⏻ | Aficio 1224C | 13873 | TEAM B | 12345678 |
| ☐ | 133.139.162.209 | 00-00-74-6C-06-87 | | ◉ | Aficio AP400 | 1211 | TEAM D | 12345678 |
| ☐ | 133.139.162.210 | 00-00-74-6C-06-87 | | ◉ | Aficio CL100 | 3200 | TEAM B | 12345678 |
| ☐ | 133.139.162.211 | 00-00-74-6C-06-87 | | ◉ | CanonLBP2510 | 1200 | TEAM B | 12345678 |
| ☐ | 133.139.162.212 | 00-00-74-6C-06-87 | | ◉ | HPLaserJet4600 | 3210 | TEAM B | 12345678 |

1200   1300   1400

1-12 /12 item(s)  ☐ / page

| NETWORK DOMAIN | CREATION STATE |
|---|---|
| A | CONTINUE |
| B | END |
| C | END |
|  |  |
|  |  |
|  |  |

2300

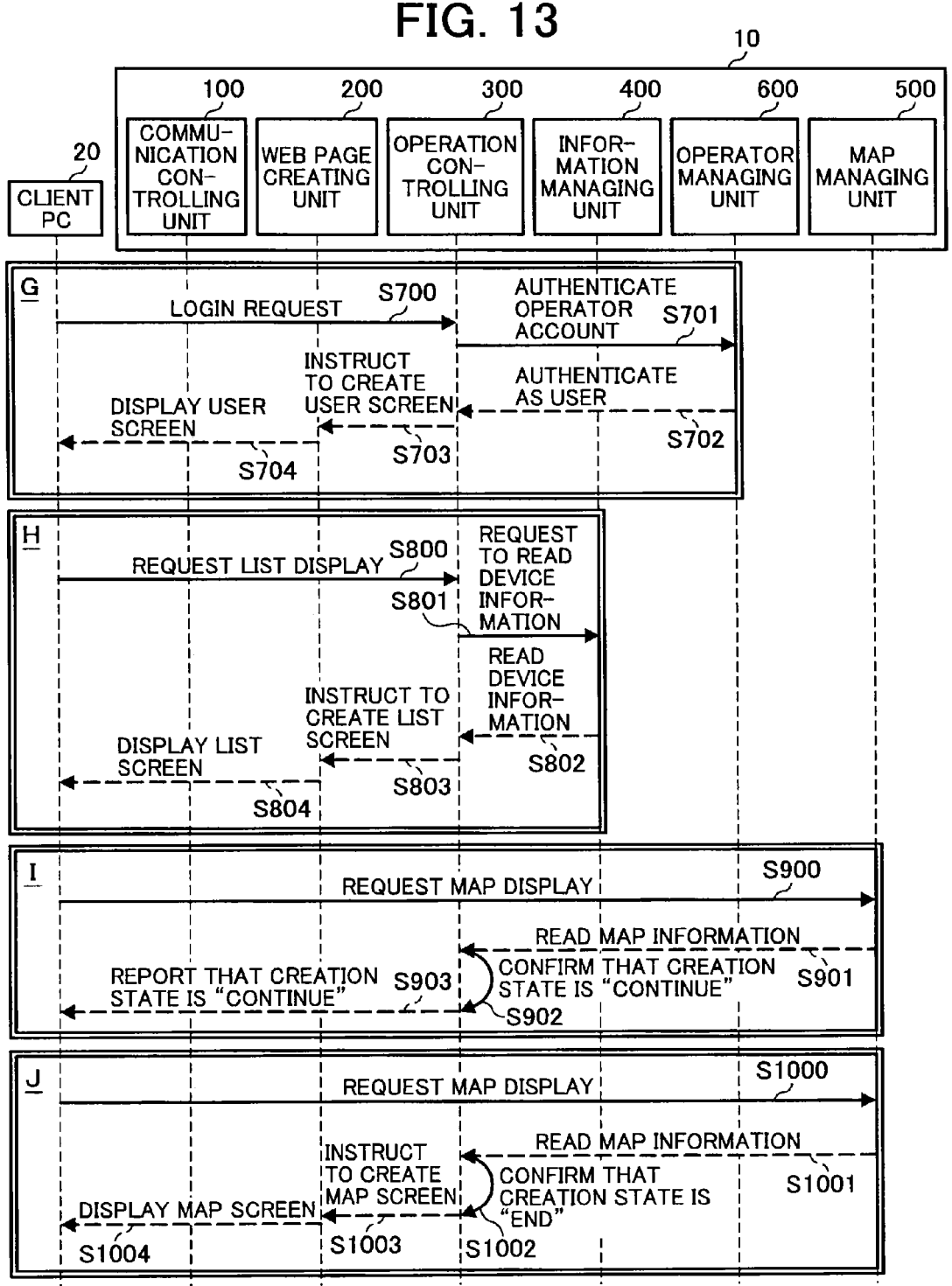

NETWORK-MANAGEMENT DEVICE, NETWORK-MANAGEMENT METHOD, AND COMPUTER PROGRAM PRODUCT

CROSS-REFERENCE TO RELATED APPLICATIONS

The present application is a continuation of U.S. application Ser. No. 11/831,295 filed Jul. 31, 2007, now U.S. Pat. No. 8,316,304, and claims priority to Japanese priority document, 2006-224590 filed in Japan on Aug. 21, 2006, the entire contents of each of which are incorporated herein by reference.

BACKGROUND OF THE INVENTION

1. Field of the Invention

The present invention relates to a technology for managing a network device.

2. Description of the Related Art

There has been need of a technology for managing network devices, such as printer, multifunction product (MFP), and server, operating on a network. For example, Japanese Patent Application Laid-open No. 2000-194626 discloses a conventional technology in which all network devices registered to a network are detected to create a list and a map.

However, with the conventional technology, if there is a large number of network devices, considerable time is required to lay out the map, and it is often the case that creation of a list or a map is interrupted or carried over to the following day. Such an incomplete list or map is missing some information and does not match an actual situation, and therefore, cannot be provided to users. Even if the list or map is determined to be complete, there may be information missing, which confuses users.

SUMMARY OF THE INVENTION

It is an object of the present invention to at least partially solve the problems in the conventional technology.

According to an aspect of the present invention, a network-management device includes an acquiring unit that acquires device information on all network devices operating on a network, a first storing unit that stores therein the device information, a display unit that displays the device information in a list, a designating unit that designates a layout position on a map where device information on each of the network devices is to be laid out, a selecting unit that selects a display image for each of the network devices based on type of the network device, a creating unit that creates the map by laying out on the map the device information on each of the network devices with the display image based on the layout position, a specifying unit that specifies a creation state of the map, and a second storing unit that stores therein the creation state in association with the map.

According to another aspect of the present invention, a network-management method includes acquiring device information on all network devices operating on a network, storing the device information, displaying the device information in a list, designating a layout position on a map where device information on each of the network devices is to be laid out, selecting a display image for each of the network devices based on type of the network device, creating the map by laying out on the map the device information on each of the network devices with the display image based on the layout position, specifying a creation state of the map, and storing the creation state in association with the map.

According to still another aspect of the present invention, a computer program product includes a computer usable medium having computer readable program codes embodied in the medium that, when executed, cause a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an example of a list screen of the network-management device;

FIG. 9 is an example of a creation state stored in the network-management device;

FIG. 13 is a sequence diagram of operation of the network-management device in response to requests from a user.

DETAILED DESCRIPTION OF THE PREFERRED EMBODIMENTS

Exemplary embodiments of the present invention are described in detail below with reference to the accompanying drawings.

Figure 1:
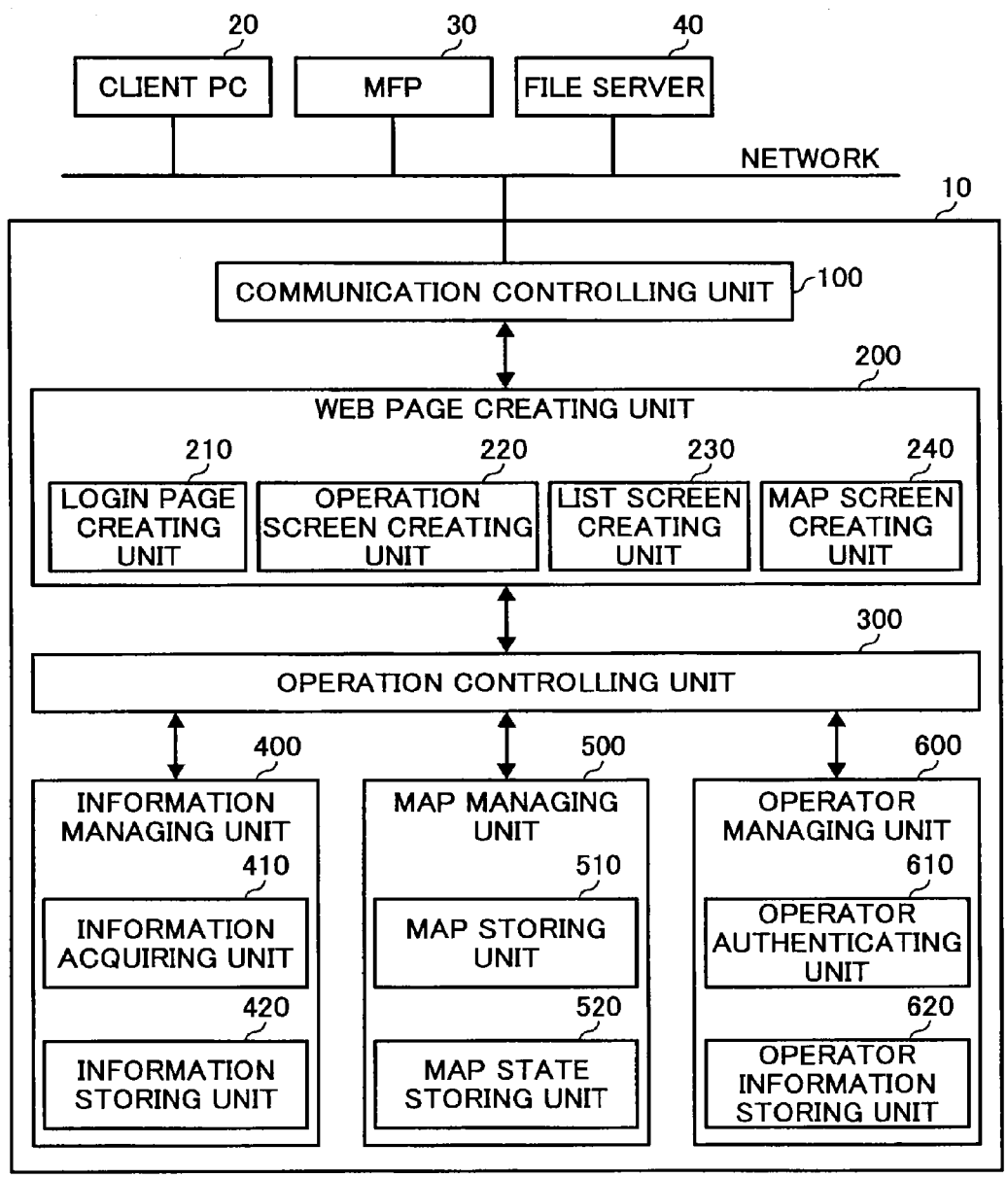
FIG. 1 is a block diagram of a network-management device according to an embodiment of the present invention.

FIG. 1 is a block diagram of a network-management device 10 according to an embodiment of the invention. The network-management device 10 manages registration of various network devices on the network. The network-management device 10 is connected to a network, such as a local area network (LAN), a wide area network (WAN), or the Internet. To the network are also connected a client personal computer (PC) 20, a MFP 30, and a file server 40 provided in an office.

The network is physically connected by an Ethernet® cable such as 100BASE-TX. Communication on the network is controlled using a suitable protocol for each device, such as transmission control protocol/internet protocol (TCP/IP) and user datagram protocol (UDP)/IP. The devices capable of communication and connected to the network, such as the client PC 20, the MFP 30, the file server 40, are hereinafter collectively referred to as network device.

The network-management device 10 includes a communication controlling unit 100, a web page creating unit 200, an operation controlling unit 300, an information managing unit 400, a map managing unit 500, and an operator managing unit 600. In the following, the network-management device 10 is explained as being accessed from the client PC 20. The network-management device 10 can be operated through a display (not shown) connected to the network-management device 10. The network-management device 10 can also be operated from a remote network device via the network.

Examples of applications used in the operation include Internet browser such as Internet Explorer®, Mozilla®, and Netscape Navigator®. These applications can be bundled with an operating system (OS) or distributed for free, and easily available.

The communication controlling unit 100 controls communication when information on the network device is disclosed or acquired by a communication command. For example, the communication controlling unit 100 can be implemented by freeware including a web server such as Apache. When the Internet browser is used to operate the network-management device 10, the communication controlling unit 100 includes a computer program (communication control program) using web browsing protocols, such as hypertext transfer protocol (HTTP).

The web page creating unit 200 creates a structured file written in hypertext markup language (HTML), extensible hypertext markup language (XHTML), and extensible markup language (XML) to be displayed on an operation screen in response to an instruction from an operator. The web page creating unit 200 includes a login page creating unit 210, an operation screen creating unit 220, a list screen creating unit 230, and a map screen creating unit 240.

Figures 2, 3:
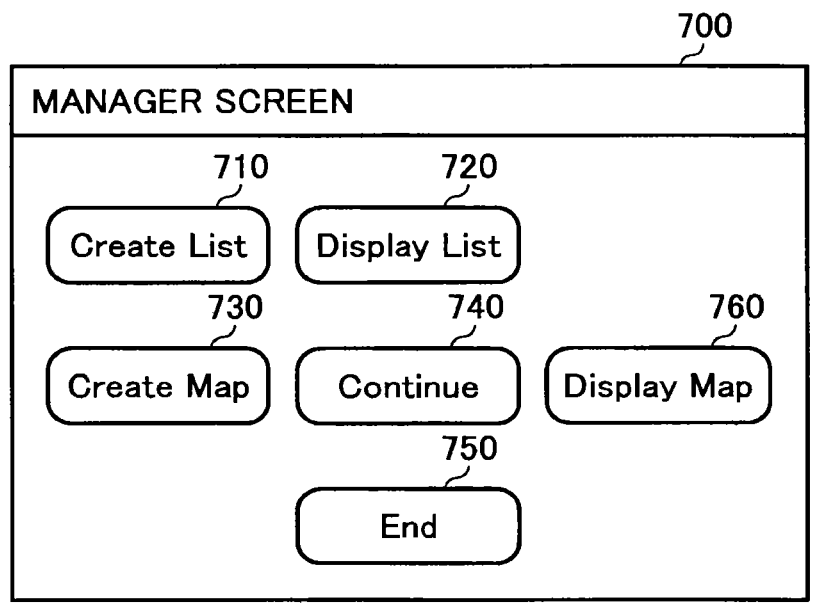
FIG. 2 is an example of a login screen of the network-management device.
FIG. 3 is an example of a manager screen of the network-management device.

The login page creating unit 210 creates a login screen as shown in FIG. 2 through which a network manager or a user can access the network-management device 10. When the network-management device 10 is started, the login screen for entering a login account and a password appears. The operation screen creating unit 220 creates an operation screen used after login. Instructions from an operator vary depending on whether the operator has logged in as a network manager or a user. Accordingly, an operation screen as shown in FIG. 3 or 4 is created depending on a logged-in operator.

FIG. 3 is an example of a manager screen 700 of the network-management device 10. The manager screen 700 includes six buttons through which a network manager enters commands. The six buttons include Create List 710, Display List 720, Create Map 730, Continue 740, End 750, and Display Map 760.

The Create List 710 is used to create list information 1000 of network devices. The Display List 720 is used to display the list information 1000 on the screen. The Create Map 730 is used to create map information 2000 of network devices. The Continue 740 is used to designate "continue", after the map information 2000 is stored, as a creation state 2300 to indicate that a map is in process of being created. The End 750 is used to designate "end", after the map information 2000 is stored, as the creation state 2300 to indicate that creation of a map is completed. The Display Map 760 is used to display the stored map information 2000 on the screen.

Figure 4:
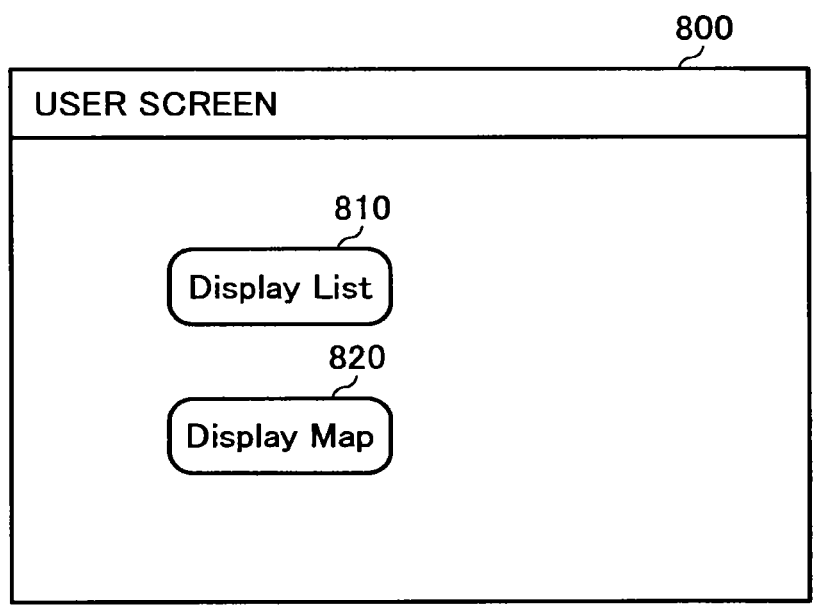
FIG. 4 is an example of a user screen of the network-management device.

FIG. 4 is an example of a user screen 800 of the network-management device 10. The user screen 800 includes two buttons through which a user enters commands. The two buttons include Display List 810 and Display Map 820. The Display List 810 is used to display the list information 1000 on the screen. The Display Map 820 is used to display the map information 2000 on the screen.

The list screen creating unit 230 creates a list screen 3000 based on the list information 1000. FIG. 5 is an example of the list screen 3000. The list screen 3000 displays a list created from the list information 1000, containing such information as IP address 1200, media access control (MAC) address 1300, and specific information 1400 (serial number, counter, etc.) of network devices.

Figure 6:
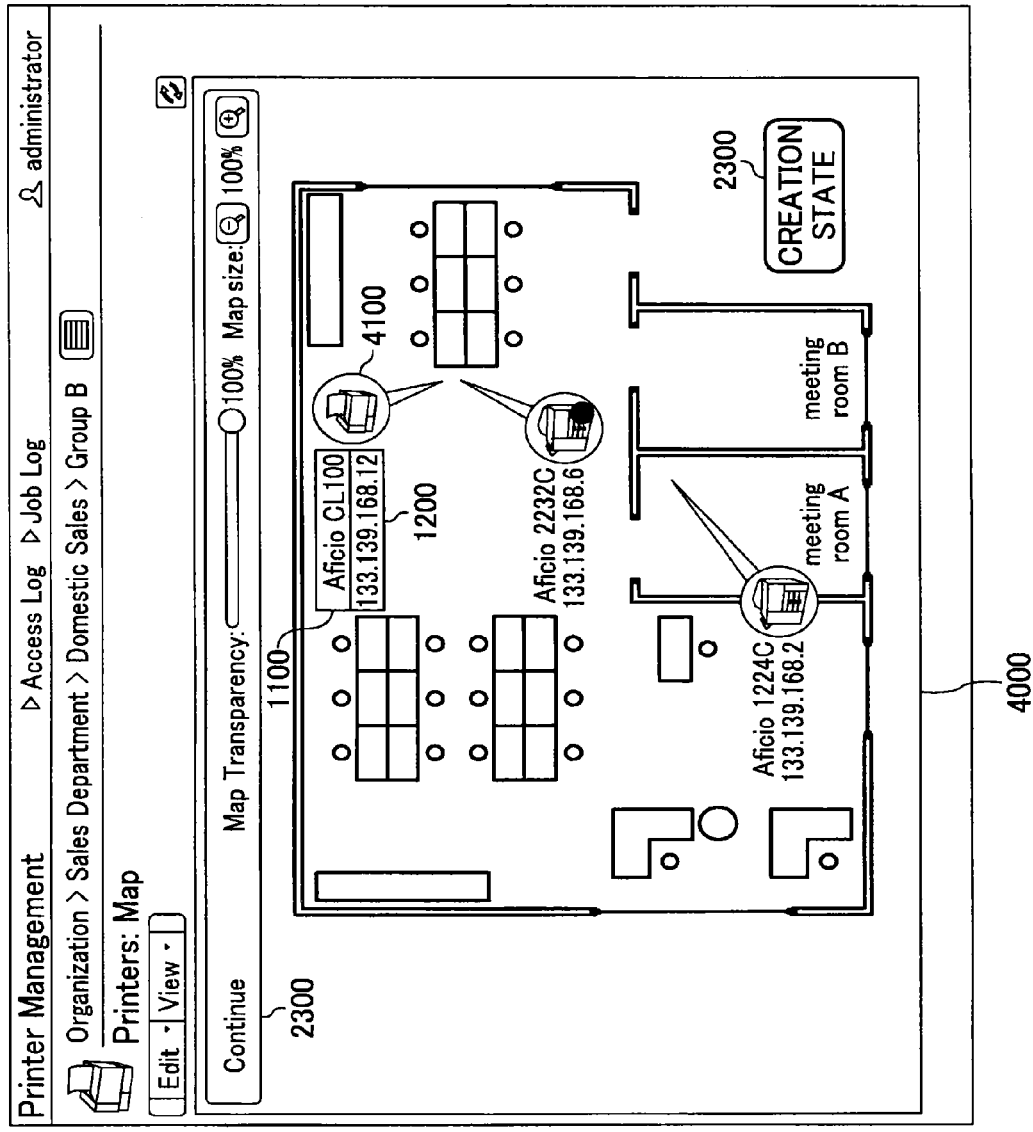
FIG. 6 is an example of a map screen of the network-management device.

The map screen creating unit 240 creates a map screen 4000 based on the map information 2000. FIG. 6 is an example of the map screen 4000. The map screen 4000 displays the creation state 2300 as well as a map created from the map information 2000, in which name 1100, the IP address 1200, and a graphic image 4100 of network devices are displayed at corresponding coordinates 2200.

The operation controlling unit 300 controls the communication controlling unit 100, the web page creating unit 200, the information managing unit 400, the map managing unit 500, and the operator managing unit 600. The operation controlling unit 300 includes a central processing unit (CPU), a read-only memory (ROM), and a random access memory (RAM). The CPU operates using a work area of the RAM according to a computer program stored in the ROM, thereby implementing network management of the embodiment.

The information managing unit 400 manages information obtained from network devices via the communication controlling unit 100. The information managing unit 400 includes an information acquiring unit 410 and an information storing unit 420. The information acquiring unit 410 acquires information on network devices, such as the name 1100, the IP address 1200, the MAC address 1300, and the specific information 1400 included in the list information 1000. The information storing unit 420 stores therein the list information 1000 acquired by the information acquiring unit 410. When network device information related to a network having a plurality of domains is stored, the information is stored for each network management domain.

Figure 7:
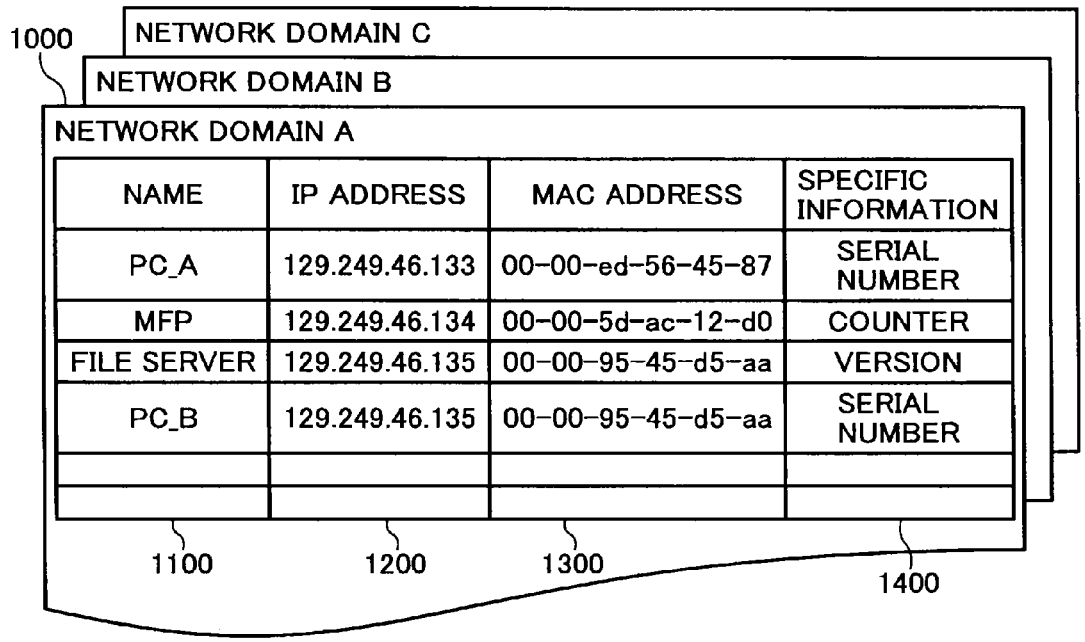
FIG. 7 is an example of list information stored in the network-management device.

FIG. 7 is an example of the list information 1000. The list information 1000 is a list including the name 1100, the IP address 1200, the MAC address 1300, and the specific information 1400. Details of operation procedures for information entry do not enter into the present invention, and is not described herein.

The map managing unit 500 manages the map information 2000 and the creation state 2300 based on the list information 1000 stored in the information storing unit 420 and the coordinates 2200 indicated by the network manager. The map managing unit 500 includes a map storing unit 510 and a map state storing unit 520. The map storing unit 510 stores therein the map information 2000.

Figure 8:
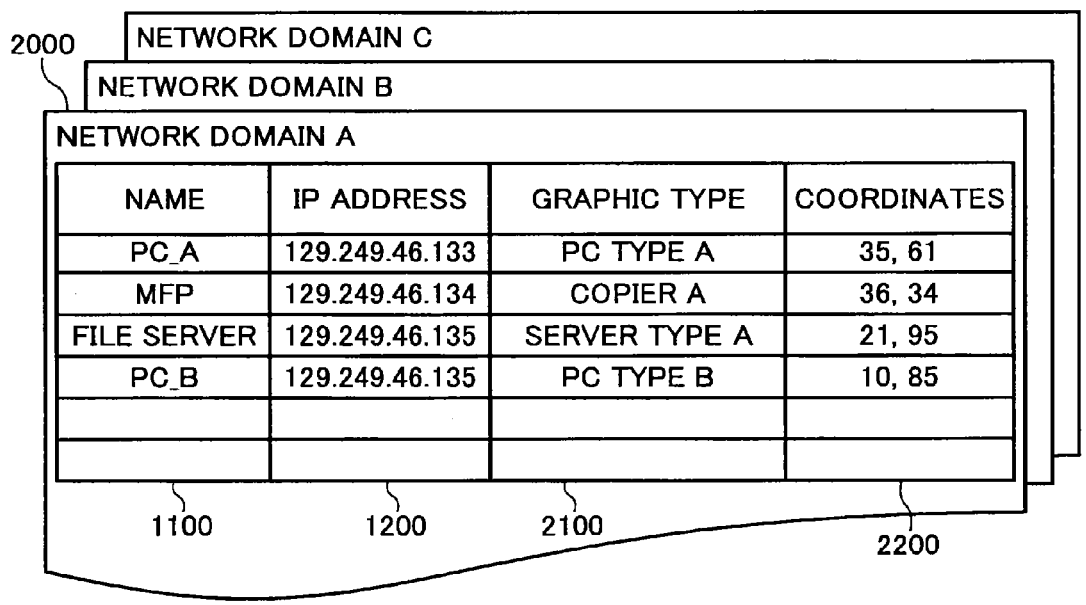
FIG. 8 is an example of map information stored in the network-management device.

FIG. 8 is an example of the map information 2000. The map information 2000 is a list including the name 1100, the IP address 1200, a graphic type 2100, and the coordinates 2200 of network devices. The name 1100 and the IP address 1200 are the same as those stored in the list information 1000. The map state storing unit 520 stores therein either "continue" or "end" selected as the creation state 2300 in the map information 2000.

FIG. 9 is an example of how the creation state 2300 is stored. In FIG. 9, the creation state 2300 is stored in a list including network domain name and map-creation state indicating whether map creation is in process or completed. When the network has a plurality of domains, the map-creation state is stored for each network domain.

The operator managing unit 600 controls access to the network-management device 10. The operator managing unit 600 includes an operator authenticating unit 610 and an operator information storing unit 620. The operator information storing unit 620 stores therein operator information used for authentication by the operator authenticating unit 610. When the operator enters a login account and a password on the login screen shown in FIG. 2, the operator authenticating unit 610 compares the entered information with the operator information stored in the operator information storing unit 620, and authenticates the operator who requests access permission.

Figure 10:
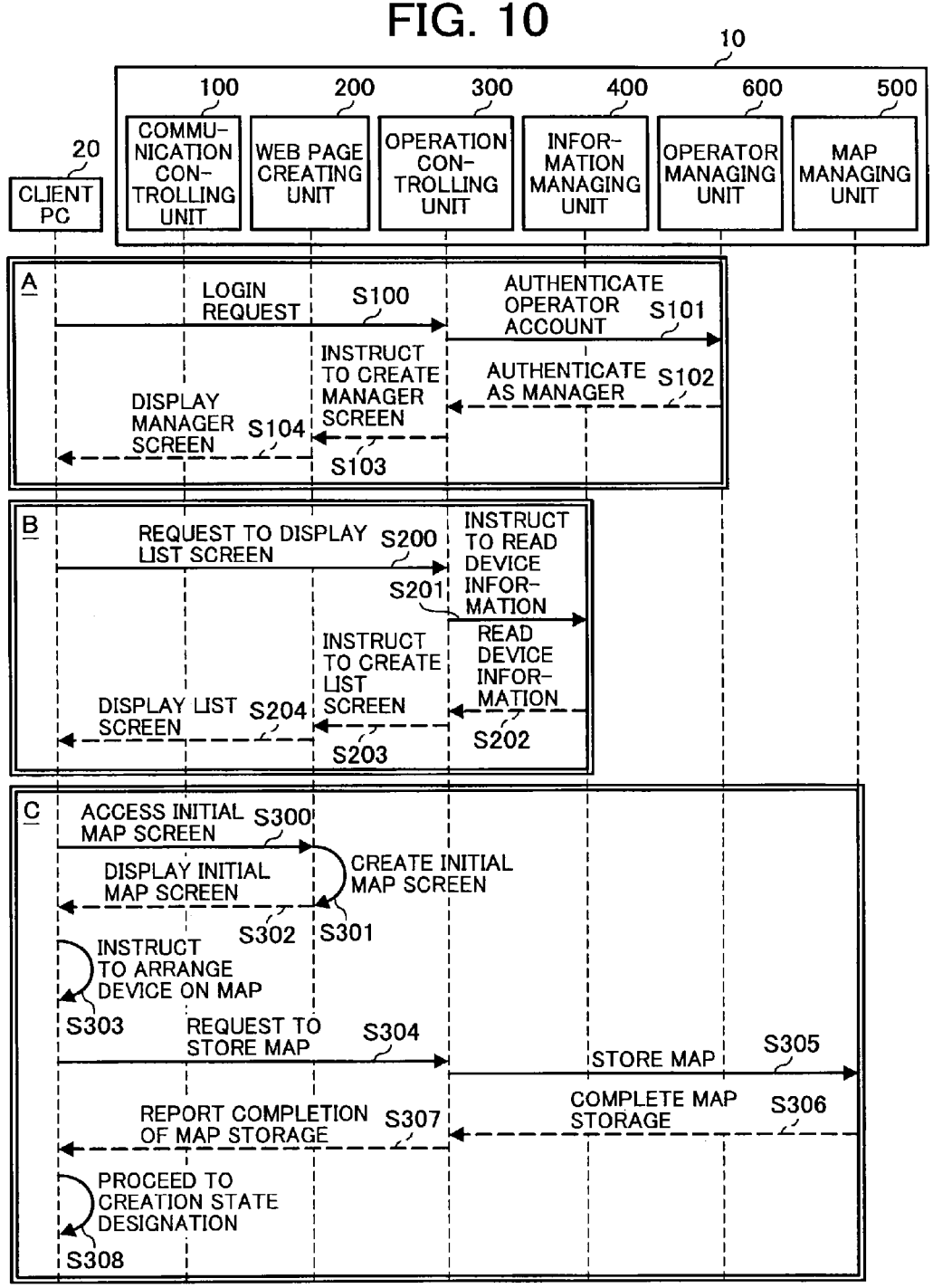
FIGS. 10 and 11 are sequence diagrams of operation of the network-management device in response to requests from a network manager.
Figure 11:
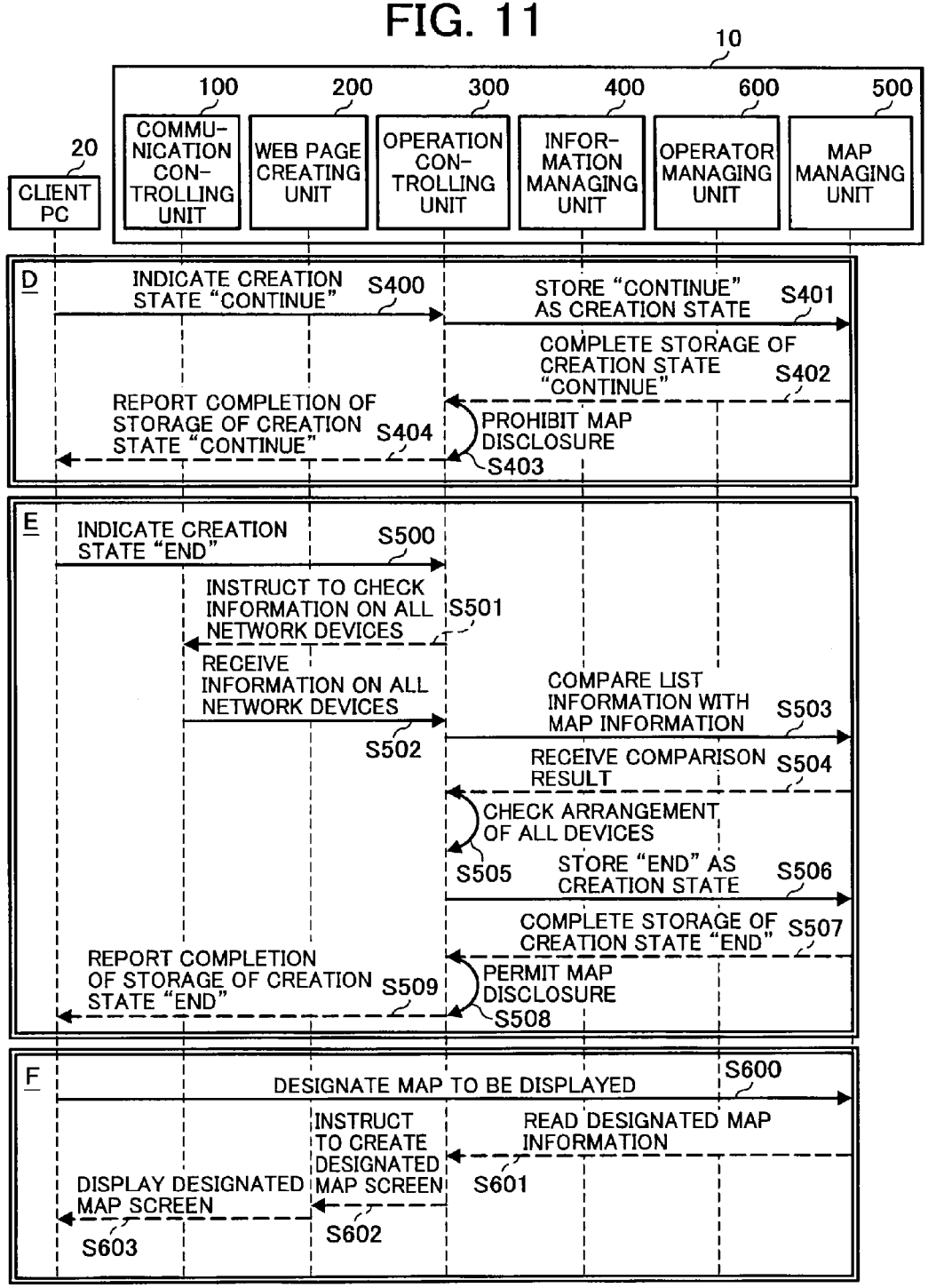

FIGS. 10 and 11 are sequence diagrams of operation of the network-management device 10 in response to requests from a network manager.

A login sequence of a network manager is described with reference to section A of FIG. 10. An operator enters a login account and a password on the login screen as a network manager (step S100). After that, the operator authenticating unit 610 compares the entered information with the operator information stored in the operator information storing unit 620 (step S101). When authenticated successfully, the operator is allowed to access the network-management device 10 as a network manager (step S102). The operation controlling unit 300 instructs the operation screen creating unit 220 to create the manager screen 700 (step S103), and the manager screen 700 is displayed (step S104).

A list-display sequence is described with reference to section B of FIG. 10. The network manager requests display of the list information 1000 through the Display List 720 (step S200). Upon receiving the request, the operation controlling unit 300 instructs the information managing unit 400 to read the list information 1000 of network devices stored in the information storing unit 420 (step S201). The information managing unit 400 reads the list information 1000 (step S202). The operation controlling unit 300 instructs the list screen creating unit 230 to create the list screen 3000 (step S203), and the list screen 3000 is displayed (step S204).

A map-creation sequence is described with reference to section C of FIG. 10. The network manager accesses an initial map screen through the Create Map 730 (step S300). The web page creating unit 200 creates the initial map screen (step S301), and the initial map screen is displayed (step S302). The network manager arranges a network device on the map (step S303). The network manager requests to store the created map information 2000 (step S304). In response to the request, the map managing unit 500 stores the map information 2000 in the map storing unit 510 (step S305). When the storage is completed (step S306), the network manager is notified that the map has been stored (step S307). The network manager proceeds to step S400 or S500 to designate the creation state 2300. (step S308).

A map-creation continuation sequence is described with reference to section D of FIG. 11. The network manager designates "continue" as the creation state 2300 through the Continue 740 (step S400). The map managing unit 500 stores "continue" in the map state storing unit 520 as the creation state 2300 (step S401). When the storage is completed (step S402), disclosure of the map information 2000 is prohibited (step S403). At the same time, the network manager is notified that the creation state 2300 "continue" has been stored (step S404).

A map-creation completion sequence is described with reference to section E of FIG. 11. The network manager designates "end" as the creation state 2300 through the End 750 (step S500). The operation controlling unit 300 instructs the communication controlling unit 100 to check information on all network devices (step S501). The operation controlling unit 300 receives information on all network devices and updates the list information 1000 using a known method in network technology (step S502). The map managing unit 500 compares the list information 1000 and the map information 2000 (step S503).

The operation controlling unit 300 receives a result of the comparison between the list information 1000 and the map information 2000 (step S504). The operation controlling unit 300 checks whether the list information 1000 and the map information 2000 match (step S505). If the list information 1000 and the map information 2000 do not match, the network manager is notified of network abnormality. Details of the notification do not enter into the present invention, and is not described herein. The map managing unit 500 stores "end" in the map state storing unit 520 as the creation state 2300 (step S506). When the storage is completed (step S507), disclosure of the map information 2000 is permitted (step S508). At the same time, the network manager is notified that the creation state 2300 "end" has been stored (step S509).

A map display sequence is described with reference to section F of FIG. 11. The network manager designates the map information 2000 to be displayed through the Display Map 760 (step S600). The map managing unit 500 reads the designated map information 2000 (step S601). The operation controlling unit 300 instructs the map screen creating unit 240 to create a map screen corresponding to the map information 2000 (step S602), and the map screen 4000 is displayed (step S603).

Figure 12:
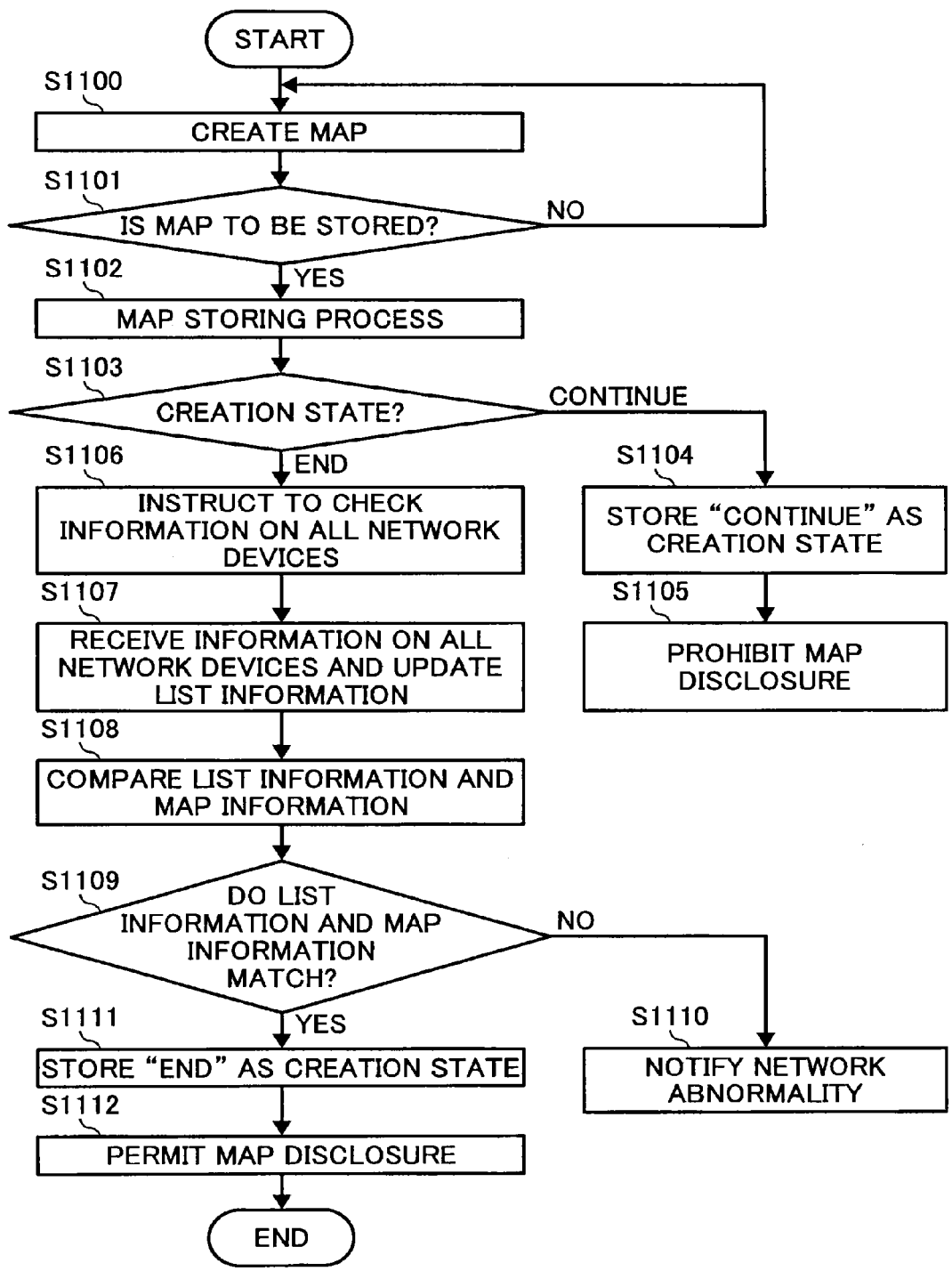
FIG. 12 is a flowchart of a map storing process performed by the network-management device.

FIG. 12 is a flowchart of a map storing process performed by the network-management device 10 to store the map information 2000 and the creation state 2300. After the map information 2000 is created (step S1100), the network manager selects whether to store the map information 2000 (step S1101). When, the map information 2000 is not to be stored (No at step S1101), the process control returns to step S1100. When the map information 2000 is to be stored (Yes at step S1101), the map storing process is performed (step S1102). The network manager is instructed to select the creation state 2300 (step S1103). When "continue" is selected, "continue" is stored as the creation state 2300 (step S1104). At the same time, disclosure of the map information 2000 is prohibited (step S1105).

When "end" is selected, an instruction to check information on all network devices is issued (step S1106). Based on information on all network devices received through a known method in network technology, the list information 1000 is updated (step S1107). The list information 1000 is compared with the map information 2000 (step S1108).

It is checked whether the list information 1000 matches the map information 2000 (step S1109). When they do not match (No at step S1109), the network manager is notified of network abnormality (step S1110). When they match (Yes at step S1109), "end" is stored as the creation state 2300 (step S1111). At the same time, the disclosure of the map information 2000 is permitted (step S1112).

FIG. 13 is a sequence diagram of operation of the network-management device 10 in response to requests from a user.

A login sequence performed by a user is described with reference to section G of FIG. 13. An operator enters a login account and a password on the login screen as a user (step S700). After that, the operator authenticating unit 610 compares the entered information with the operator information stored in the operator information storing unit 620 (step S701). When authenticated successfully, the operator is allowed to access the network-management device 10 as a user (step S702). The operation controlling unit 300 instructs the operation screen creating unit 220 to create the user screen 800 (step S703), and the user screen 800 is displayed (step S704).

A list-display sequence is described with reference to section H of FIG. 13. The user requests display of the list information 1000 through the Display List 810 (step S800). Upon receiving the request, the operation controlling unit 300 instructs the information managing unit 400 to read the list information 1000 stored in the information storing unit 420 (step S801). The information managing unit 400 reads the list information 1000 (step S802). The operation controlling unit 300 instructs the list screen creating unit 230 to create the list screen 3000 (step S803), and the list screen 3000 is displayed (step S804).

A map-creation continuation sequence is described with reference to section I of FIG. 13. The user requests display of the map information 2000 to be displayed through the Display Map 820 (step S900). The map managing unit 500 reads the map information 2000 (step S901). The operation controlling unit 300 confirms that the creation state is "continue" (step S902). Because the map disclosure is prohibited, the user is notified that the map is in process of being created (step S903).

A map-creation completion sequence is described with reference to section J of FIG. 13. The user designates the map information 2000 to be displayed through the Display Map 820 (step S1000). The map managing unit 500 reads the designated map information 2000 (step S1001). The operation controlling unit 300 confirms that the creation state 2300 is "end" (step S1002). Because map disclosure is permitted, the operation controlling unit 300 instructs the map screen creating unit 240 to create the map screen 4000 (step S1003), and the map screen 4000 is displayed (step S1004).

As described above, according to the embodiment, creation state of a map that indicates the management state of network devices on the screen is designated and stored. Appropriate processing is performed depending on the creation state. As a result, operation of managing network devices can be facilitated and performed without confusing a user on the network.

A computer program can be executed on a computer to realize the same effect or function as the network-management device shown in FIG. 1. Such a computer program is stored in a computer-readable recording medium and executed. Examples of the recording medium include a compact disc read-only memory (CD-ROM), and a digital versatile disk (DVD).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management method, comprising:
   storing, in a map-information storing unit, map information, the map information being created based on an instruction to place a graphic image of a device on a map;
   storing, in a device-information storing unit, information about a device that operates on a network;
   setting, in a creation-state setting unit, a creation state of the map,
   retaining, in a creation-state retaining unit, the map in association with the creation state of the map;
   storing, in a storage unit, the information about the device in association with the creation state;
   acquiring, in an acquiring unit and from the device that operates on the network, information about the device when the set creation state of the map indicates creation of the map is completed;
   when the set creation state of the map indicates that creation of the map is completed,
      determining, in a control unit, whether the acquired information about the device is in accordance with the map information stored in the map-information storing unit, and if the acquired information about the device is in accordance with the map information, allowing disclosure of the map, and if the acquired information about the device is not in accordance with the map information, not allowing disclosure of the map;
   when a creation state is selected, displaying devices corresponding to information about the device associated with the creation state selected on the map; and
   causing the control unit to prohibit disclosure of the map when the creation state that is set by the creation-state setting unit indicates creation of the map is in progress.

2. The management method according to claim 1, wherein the creation state that is set by the creation-state setting unit indicates either creation of the map is in progress or creation of the map is completed.

3. The management method according to claim 1 further comprising:
   causing the control unit to prohibit disclosure of the map when the creation state that is set by the creation-state setting unit indicates creation of the map is in progress.

4. The management method according to claim 1 further comprising:
   notifying the device that creation of the map is in progress when the creation state that is set by the creation-state setting unit indicates creation of the map is in progress.

5. A management device comprising:
   a map-information storing unit that stores therein map information, the map information being created based on an instruction to place a graphic image of a device on a map;
   a device-information storing unit that stores therein information about a device that operates on a network;
   a creation-state setting unit that sets a creation state of the map,
   a creation-state retaining unit that retains the map in association with the creation state of the map;
   a storage unit that stores the information about the device in association with the creation state;
   an acquiring unit that acquires, from the device that operates on the network, information about the device when the set creation state of the map indicates creation of the map is completed;
   a control unit, wherein when the set creation state of the map indicates that creation of the map is completed, the control unit determines whether the acquired information about the device is in accordance with the map information stored in the map-information storing unit, and if the acquired information about the device is in accordance with the map information, the control unit allows disclosure of the map, and if the acquired information about the device is not in accordance with the map information, the control unit does not allow disclosure of the map; and
   an instructing unit that causes the control unit to prohibit disclosure of the map when the creation state that is set by the creation-state setting unit indicates creation of the map is in progress,
   wherein when a creation state is selected, devices corresponding to information about a device associated with the creation state selected are displayed on the map.

6. The management device according to claim 5, wherein the creation state that is set by the creation-state setting unit indicates either creation of the map is in progress or creation of the map is completed.

7. The management device according to claim 5 further comprising a notifying unit that notifies the device that creation of the map is in progress when the creation state that is set by the creation-state setting unit indicates creation of the map is in progress.

8. A management system, comprising:
a device that operates on a network; and
a management device that includes
a map-information storing unit that stores therein map information, the map information being created based on an instruction to place a graphic image of a device on a map;
a device-information storing unit that stores therein information about the device that operates on a network;
a creation-state setting unit that sets a creation state of the map,
a creation-state retaining unit that retains the map in association with the creation state of the map;
a storage unit that stores the information about the device in association with the creation state;
an acquiring unit that acquires, from the device that operates on the network, information about the device when the set creation state of the map indicates creation of the map is completed; and
a control unit, wherein when the set creation state of the map indicates that creation of the map is completed, the control unit determines whether the acquired information about the device is in accordance with the map information stored in the map-information storing unit, and if the acquired information about the device is in accordance with the map information, the control unit allows disclosure of the map, and if the acquired information about the device is not in accordance with the map information, the control unit does not allow disclosure of the map; and an instructing unit that causes the control unit to prohibit disclosure of the map when the creation state that is set by the creation-state setting unit indicates creation of the map is in progress,
wherein when a creation state is selected, devices corresponding to information about a device associated with the creation state selected are displayed on the map.

9. The management system according to claim 8, wherein the creation state that is set by the creation-state setting unit indicates either creation of the map is in progress or creation of the map is completed.

10. The management system according to claim 8, wherein the management device further includes a notifying unit that notifies the device that creation of the map is in progress when the creation state that is set by the creation-state setting unit indicates creation of the map is in progress.

* * * * *